US011326298B2

(12) United States Patent
Hansson (10) Patent No.: US 11,326,298 B2
(45) Date of Patent: *May 10, 2022

(54) SYSTEM AND METHOD FOR WASHING ITEMS

(71) Applicant: SWATAB Scandinavian Water Technology AB, Everöd (SE)

(72) Inventor: Per Hansson, Everöd (SE)

(73) Assignee: SWATAB Scandinavian Water Technology AB, Everöd (SE)

( * ) Notice: Subject to any disclaimer, the term of this patent is extended or adjusted under 35 U.S.C. 154(b) by 102 days.

This patent is subject to a terminal disclaimer.

(21) Appl. No.: 16/565,747

(22) Filed: Sep. 10, 2019

(65) Prior Publication Data

US 2020/0000309 A1    Jan. 2, 2020

Related U.S. Application Data

(63) Continuation of application No. 15/021,981, filed as application No. PCT/EP2014/069100 on Sep. 8, 2014, now Pat. No. 10,485,397.

(30) Foreign Application Priority Data

Sep. 17, 2013 (EP) .................................... 13184731

(51) Int. Cl.
*A47L 15/42* (2006.01)
*D06F 39/10* (2006.01)
(Continued)

(52) U.S. Cl.
CPC .......... *D06F 39/10* (2013.01); *A47L 15/0007* (2013.01); *A47L 15/0076* (2013.01);
(Continued)

(58) Field of Classification Search
CPC ............. A47L 15/4202; A47L 15/0007; A47L 15/0076; A47L 15/4214; A47L 2601/20;
(Continued)

(56) References Cited

U.S. PATENT DOCUMENTS 4,498,982 A    2/1985   Skinner
5,174,901 A   12/1992   Smith
(Continued)

FOREIGN PATENT DOCUMENTS

EP    0 476 028 B1    3/1992
EP    0 578 006 B1   12/1996
(Continued)

OTHER PUBLICATIONS

International Search Report dated Oct. 30, 2014 for corresponding application No. PCT/EP2014/061900.
(Continued)

*Primary Examiner* — Tinsae B Ayalew
(74) *Attorney, Agent, or Firm* — Renner, Otto, Boisselle & Sklar, LLP (57) ABSTRACT

A system and method for washing items with water includes a water inlet and a container for receiving the items to be washed. The system comprises a water purification apparatus for purifying water introduced through said water inlet to produce purified water. The water purification apparatus comprises at least one filter for filtering off particulate solids, a reverse osmosis device, and at least one deionizing filter. The system further comprises a reservoir for storing purified water produced by the water purification apparatus, said reservoir being connected to said water purification apparatus and said container, so that the items are washable inside the container with the purified water.

13 Claims, 6 Drawing Sheets

(51) Int. Cl.
*C02F 1/42* (2006.01)
*C02F 1/44* (2006.01)
*A47L 15/00* (2006.01)
*B08B 3/10* (2006.01)

(52) U.S. Cl.
CPC ....... *A47L 15/4202* (2013.01); *A47L 15/4214* (2013.01); *B08B 3/10* (2013.01); *C02F 1/42* (2013.01); *C02F 1/441* (2013.01); *A47L 2601/20* (2013.01); *C02F 2303/24* (2013.01); *C02F 2307/12* (2013.01)

(58) Field of Classification Search
CPC .... B08B 3/10; C02F 1/42; C02F 1/441; C02F 2303/24; C02F 2307/12; D06F 39/10
USPC ......................................................... 134/105
See application file for complete search history.

(56) References Cited

U.S. PATENT DOCUMENTS

| | | |
|---|---|---|
| 5,520,816 A | 5/1996 | Kuepper |
| 2003/0230522 A1 | 12/2003 | Pavel |
| 2009/0008318 A1 | 1/2009 | Anes |
| 2010/0084340 A1 | 4/2010 | Monsrud |
| 2011/0042205 A1 | 2/2011 | Kim |

FOREIGN PATENT DOCUMENTS

| | | |
|---|---|---|
| EP | 1 598 471 A1 | 11/2005 |
| WO | 2006/045117 A1 | 4/2006 |

OTHER PUBLICATIONS

International Preliminary Report on Patentability for corresponding application No. PCT/EP2014/061900 dated Mar. 22, 2016.

SYSTEM AND METHOD FOR WASHING ITEMS

This application is a continuation of U.S. application Ser. No. 15/021,981 filed on Mar. 15, 2016 which is a national phase of International Application No. PCT/EP2014/069100 filed Sep. 8, 2014 and published in the English language, which are hereby incorporated by reference in their entirety.

FIELD OF THE INVENTION

The invention relates to a system and a method for washing items. More specifically, the present invention relates to a system and a method for washing items with processed water or purified water, wherein the amount of, e.g. salts has been reduced. This type of systems is generally used for washing clothes and similar, wherein the system comprises a washing machine (also called laundry machine or clothes washer). Such washing machines are used as household appliances for domestic use as well as for larger scale laundry, such as in laundry facilities of apartment blocks, hospitals, etc., and for commercial and industrial laundry. This type of systems can also be used for washing other types of items, such as dishes and other eating utensils, wherein the system comprises a dishwasher. This type of systems can also be used for washing other types of items.

PRIOR ART

There are devices and systems for washing items with water in the prior art. One such type of device is for example disclosed in US2214/00131863. US2214/00131863 discloses a device in the form of a water-conducting household appliance, such as a washing machine, for washing items by means of water. The device comprises a container for items to be washed and desalination apparatus being constructed as an ion exchanger for reducing the amount of salt in the water. A reservoir is connected to the desalination apparatus for storing water with a higher salt concentration.

A problem with such devices and systems for washing items according to prior art is that the use thereof for washing items, such as laundry in the form of clothes, etc., has a considerable negative influence on the environment.

Another problem of such prior art devices and systems is that the cost for using the device for washing can be quite expensive.

SUMMARY OF THE INVENTION

An object of the present invention is to avoid the problems of the prior art devices and systems for washing items. The system and method according to the invention result in cost efficient and environmentally friendly washing of items within industry as well as for domestic use, particularly including washing of clothes and other laundry in facilities having a laundry room serving a plurality of households or including a plurality of washing machines.

The present invention relates to a system for washing items with water, comprising a water inlet and a container for receiving the items to be washed, characterised in that the system comprises a water purification apparatus for purifying water introduced through said water inlet to produce purified water, the water purification apparatus comprising at least one filter for filtering off particulate solids, a reverse osmosis device, and at least one deionizing filter, and, wherein the system further comprises a reservoir for storing purified water produced by the water purification apparatus, said reservoir being connected to said water purification apparatus and said container, so that the items are washable with the purified water. It has surprisingly been found that items, such as laundry, can be washed and cleaned satisfactorily by means of the purified water without use of, or at least with reduced amounts of, detergents or tensides. This result in cost savings and less negative influence on the environment due to reduced use of detergents for washing. Hence, the items can be washed with the purified water alone without use of detergents or tensides.

The system can be arranged for connection to a common water supply network, such as a municipal water supply network, domestic water supply network or similar. Hence, ordinary and commonly used tap water can be used by the system, wherein said tap water is purified to form the purified water and then used for washing.

The water pressure from the water supply network can be used to conduct the water to and through the water purification apparatus and, also to the reservoir. Hence, the water purification apparatus can function without a circulation pump. Alternatively, the system can comprise one or more pumps for pumping water to and/or through the system and the water purification apparatus thereof, such as from the reservoir to a washing machine or dishwasher. Optionally, the system can comprise one or more pumps for providing a suitable working pressure for the reverse osmosis device and, if desired, the one or more deionizing filters. The one or more pumps can be arranged for providing a working pressure of about 700 kPa of the reverse osmosis device and the one or more deionizing filters. Hence, due to the one or more pumps the reverse osmosis device and the deionizing filters can function effectively for a long time.

The reverse osmosis device can be arranged between the filter and the deionizing filters, wherein the water is purified to a specified extent when conducted to the deionizing filters. This results in an effective purification and a long life time of the deionizing filters.

The filter can be a filter pack comprising a sediment filter, a carbon filter and a softener filter. The filters can be arranged in said consecutive order and can be followed by the reverse osmosis device, a first deionizing filter and a second deionizing filter. This set up of water purification steps results in a highly purified water and effective use of the components of the water purification apparatus.

The system can comprise a heater for heating incoming water to, e.g. 25° C. before entering into the water purification, i.e. before entering the one or more filters or at least before entering the reverse osmosis device. This will result in efficient purification and a long life time of the reverse osmosis device. It can also result in a reliable measuring of conductivity of purified water for estimation of the purity thereof.

The water purification apparatus can be arranged for providing purified water with low or substantially no conductivity. For example, the water purification apparatus is arranged for providing purified water having substantially no charge. The water purification apparatus can be arranged for providing purified water with 0-5 or 0-2 ppm total dissolved solids, e.g. measured with a TDS meter, e.g. at a specified temperature such as 25° C. This will provide highly purified water, which efficiently washes items for cleaning thereof. Such highly purified water has surprisingly been found to clean the items, such as laundry, in the system to such an extent that no tensides or detergents seem to be required for obtaining the desired cleaning result.

The present invention also relates to a method for washing items with water, comprising the steps of a) conducting water from a water supply to a water inlet of a system for washing said items, b) conducting said water to a water purification apparatus for purifying said water, c) filtering off particulate solids from the water inside the water purification apparatus, d) purifying the water by means of reverse osmosis inside the water purification apparatus, e) filtering the water through at least one deionizing filter inside the water purification apparatus, f) conducting the purified water to a reservoir for storing the purified water, g) conducting the purified water from the reservoir to a container with the items to be washed, and h) washing the items inside the container with the purified water from the water purification apparatus.

The method according to the invention makes it possible to obtain purified water from tap water or similar for washing the items efficiently, wherein the items can be cleaned without the use of tensides or detergents.

Further characteristics and advantages of the present invention will become apparent from the description of the embodiments below, the appended drawings and the dependent claims.

SHORT DESCRIPTION OF THE DRAWINGS

The invention will now be described more in detail with the aid of embodiments and with reference to the appended drawings, in which.

THE INVENTION

Figure 1:
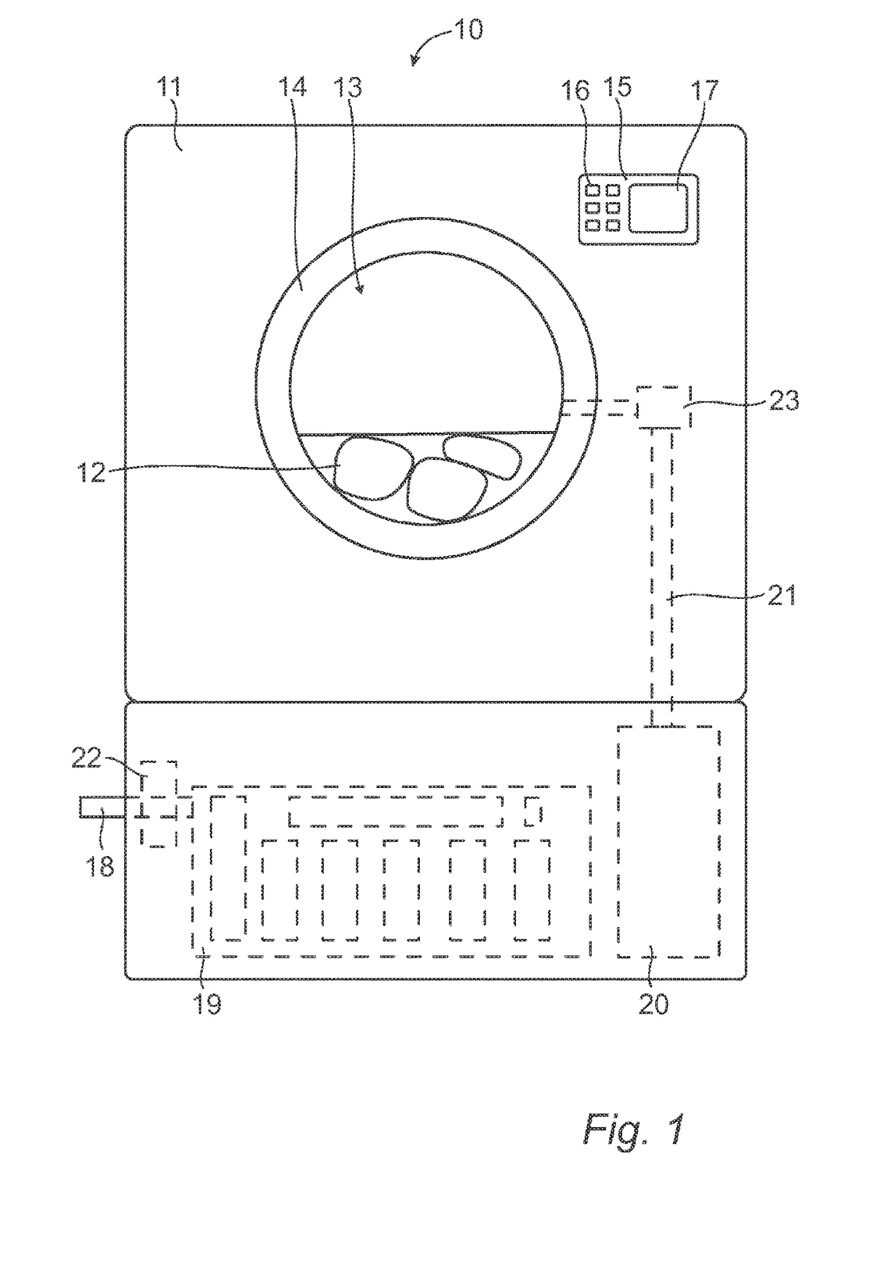
FIG. 1 is a schematic front view of a system for washing items according to one embodiment of the invention, wherein the system comprises a washing machine.

Referring to FIG. 1 a system 10 for washing items according to one embodiment is disclosed. The system 10 according to FIG. 1 comprises a washing machine 11 for washing items 12, such as clothes, linen and similar. For example, the system 10 is a household appliance for washing laundry. According to one embodiment the system 10 is arranged for serving a plurality of households for washing laundry. For example, the system 10 includes one or more washing machines 11 of a laundry room in an apartment block or similar. For example, the system 10 is arranged for washing items 12, such as laundry, without using tensides or detergents. Hence, according to one embodiment the system 10 is arranged for simultaneously washing a plurality of items 12.

The system 10, or the washing machine 11 of the system 10, comprises a container 13 for accommodating the items 12 to be washed. The system 10 comprises a door 14 for closing the container 13 and for loading of items 12 into the container 13. For example, the container 13 is a rotating laundry drum of conventional type, wherein the items 12 to be washed are loaded into the container 13 and rotated therein. The system 10 also comprises a control panel 15 for setting or controlling a washing program to be used. The control panel 15 is, for example, of conventional type and includes buttons 16 and a display 17 or similar means for controlling the system 10 or the washing machine 11 thereof.

The system 10 further comprises a water inlet 18, a water purification apparatus 19, a reservoir 20 and a tubing 21. A part of the water inlet 18, the water purification apparatus 19, the reservoir 20 and the tubing 21 are illustrated by means of dashed lines in FIG. 1. The water inlet 18 is arranged to be connected to a municipal water supply network or similar for allowing water, such as conventional tap water, from said water supply network to enter the system 10. The water inlet 18 is connected to the water purification apparatus 19 for conducting water from the water supply network to the water purification apparatus 19. The water purification apparatus 19 is arranged for purifying water from the water inlet 18 and produce purified water, which is described more in detail below. The water purification apparatus 19 is connected to the reservoir 20, which reservoir 20 is arranged for storing purified water, i.e. the water purified by the water purifying apparatus 19. The reservoir 20 is connected to the container 13 through the tubing 21, wherein purified water stored in the reservoir 20 can be conducted to the container 13 on demand for washing items 12 therein. In the embodiment of FIG. 1 the system 10 comprises an optional pump 22 for pumping water from the water inlet 18 to the water purification apparatus 19 and further to the reservoir 20. Alternatively, the water pressure from the water supply network is used for conducting water to and through the water purification apparatus. In the illustrated embodiment the system 10 also comprises a pumping device 23 for pumping purified water from the reservoir 20 to the container 13 for washing items therein. For example, the washing machine 11 comprises the pumping device 23. The pump 22 and the pumping device 23 are illustrated by means of dashed lines in FIG. 1.

Figure 2:
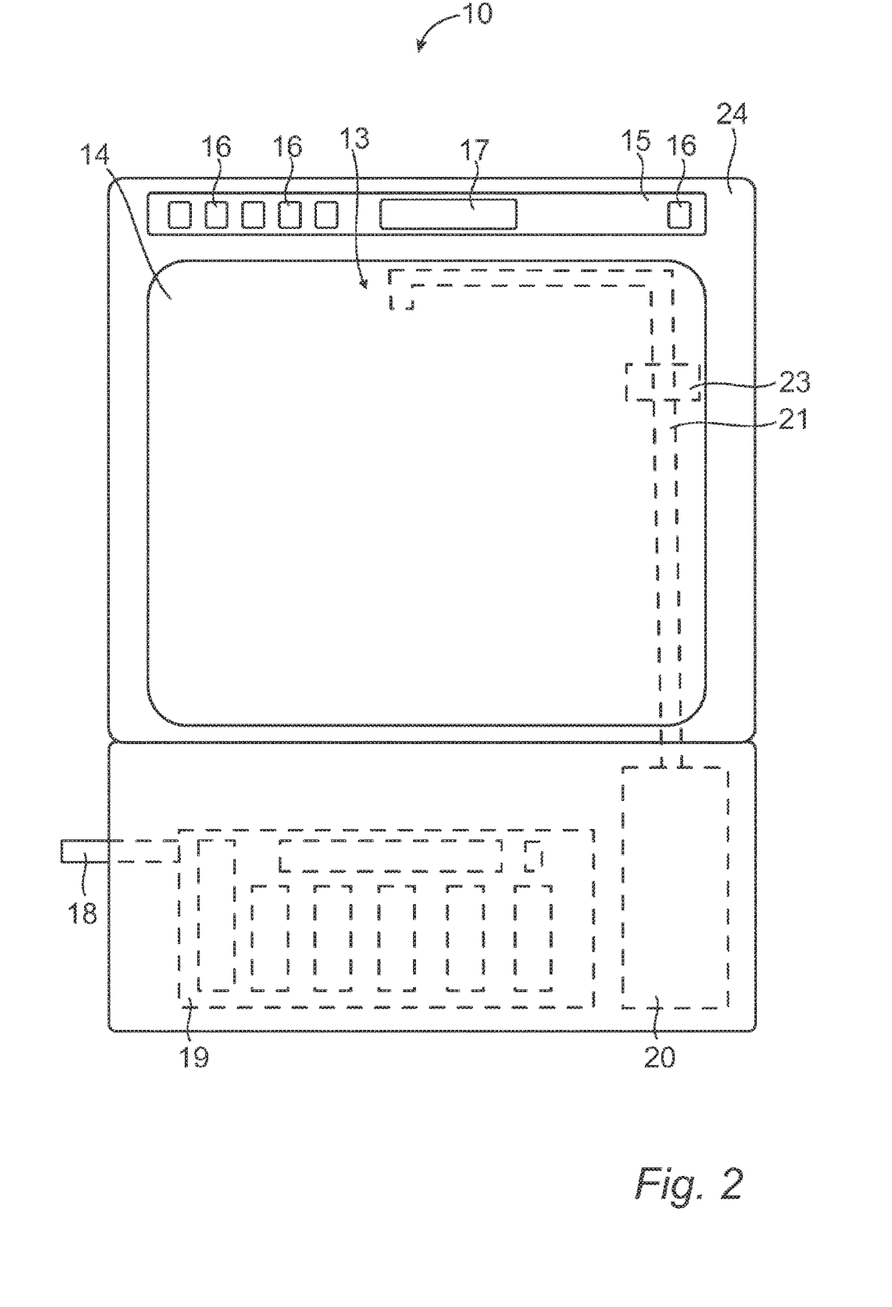
FIG. 2 is a schematic front view of a system for washing items according to one embodiment of the invention, wherein the system comprises a dishwasher.

With reference to FIG. 2 an alternative embodiment is illustrated, wherein the system 10 comprises a dishwasher 24 for domestic or industrial use. For example, the system 10 comprises a dishwasher 24 for handling dishes, eating utensils, pots, pans and similar in a restaurant, school or similar type of dining hall. For example, the system 10 is arranged for washing items, such as dishes, without using tensides or detergents.

According to the embodiment of FIG. 2 the system 10, or the dishwasher 24, comprises the container 13. For example, the container 13 forms a conventional dishwasher cleaning compartment. The dishwasher 24 further comprises the door 14 for closing the container 13, and the control panel 15, for example with buttons 16 and a display 17, for controlling a washing program. The system 10 also comprises the water inlet 18, the water purification apparatus 19, the reservoir 20 and the tubing 21. In the embodiment of FIG. 2 the system 10 also comprises the pumping device 23 for pumping purified water from the reservoir 20 to the container 13 during washing of the items in the container 13.

Figure 3:
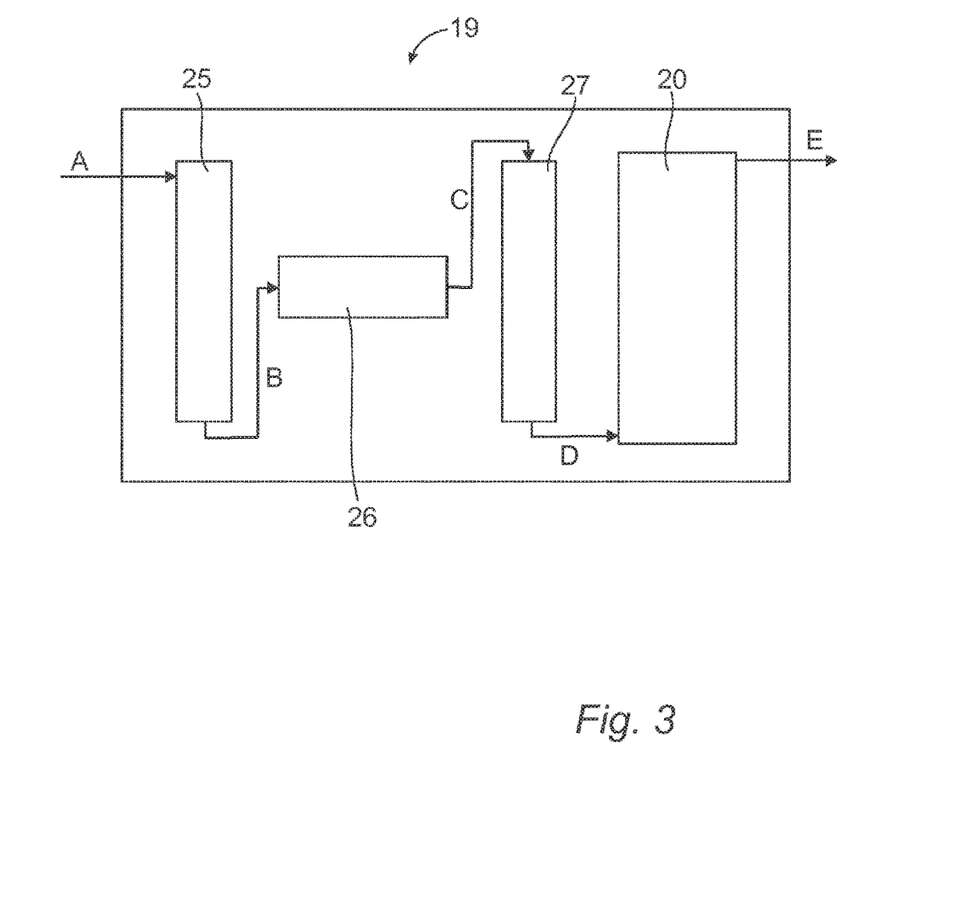
FIG. 3 is a schematic view illustrating a water purifying apparatus of the system according to one embodiment.

The water purification device 19 according to one embodiment is disclosed more in detail in FIG. 3. The water purification apparatus 19 is arranged for purifying water from a water supply network, such as a municipal water supply network, providing tap water or similar to different types of facilities, such as domestic houses, apartment buildings, commercial buildings and industry.

Conductivity is one measure to determine the degree of purity of water. Conductance meters can be used for such determinations. Conductivity is given as µS/cm (microSiemens per centimeter). Tap water can probably have a conductivity of 700-900 µS/cm. Values for distilled water has been indicated to be between 0.5 and 5 µS/cm. For example, a conventional TDS meter indicates the total dissolved solids (TDS) of a solution, i.e. the concentration of dissolved solids in it. Since dissolved ionized solids, such as salts and minerals, increase the conductivity of a solution, a TDS meter measures the conductivity of the solution, estimates the total dissolved solids from that and displays it as ppm (parts per million). Tap water normally has between 220 and 350 ppm measured with a conventional TDS meter.

The water purification apparatus 19 is arranged to provide purified water having less than 10 ppm, such as less than 5 ppm or 0-2 ppm measured with a TDS meter, e.g. at 25° C. For example, the water purification apparatus 19 is arranged for providing purified water having a conductivity of less than 0.5 µS/cm, such as less than 0.1 µS/cm. Hence, the purified water has substantially no charge and substantially no conductivity. For example, the water purification apparatus 19 is arranged for providing water with less conductivity than distilled water.

The water purification apparatus 19 according to the embodiment of FIG. 3 comprises a filter 25, a reverse osmosis device 26 and a deionizing filter 27. The water purification apparatus 19 is connected to the water inlet 18 for conducting water from a water supply network or similar to the filter 25, which is illustrated by means of the arrow A in FIG. 3. The filter 25 is arranged for filtering off particulate solids. For example, the filter 25 is a sediment filter. For example, the filter 25 is also arranged for removing chlorine and for softening the water. The filter 25 is, for example, arranged as a filter pack including a plurality of filters, such as one or more sediment filters, carbon filters and softener filters. The water is then conducted to the reverse osmosis device 26, which is illustrated by means of the arrow B in FIG. 3, for removing particles from the water and purifying the water further. The water is then conducted to the deionizing filter 27, which is illustrated by means of the arrow C in FIG. 3, for deionizing the water. For example, the deionizing filter 27 is a double deionizing filter. Then the purified water is conducted to the reservoir 20, which is illustrated by means of arrow D in FIG. 3. Purified water can be conducted from the reservoir 20, which is illustrated by means of the arrow E, for washing the items 12 in the container 13 as described above.

Figure 4:
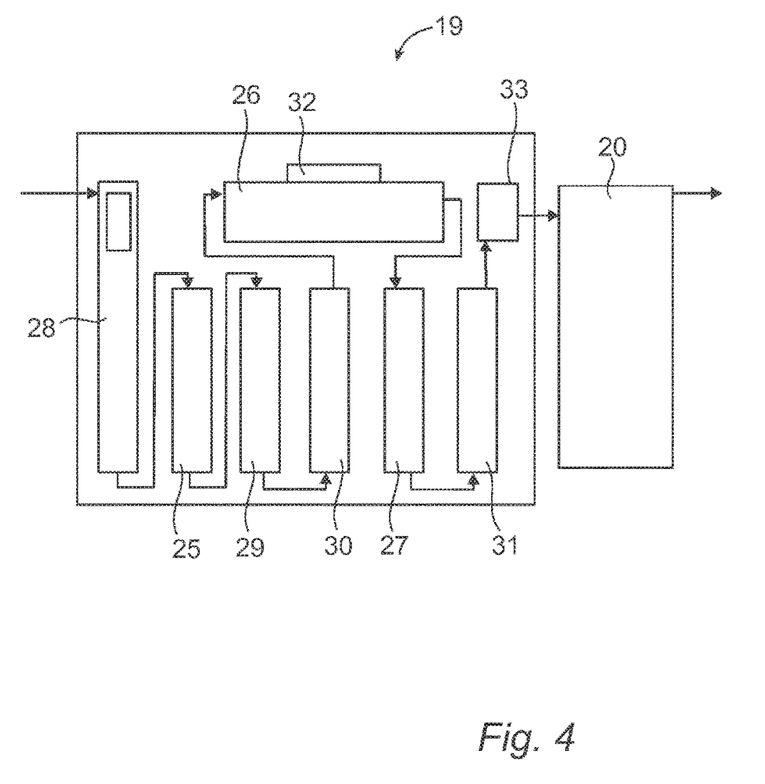
FIG. 4 is a schematic view illustrating a water purifying apparatus of the system according to another embodiment.

With reference to FIG. 4 another embodiment of the water purification apparatus 19 of the system 10 is illustrated. In the embodiment of FIG. 4 the water purification apparatus 19 comprises a heater 28, the filter 25, a carbon filter 29, a softener filter 30, the reverse osmosis device 26, a first deionizing filter 27 and a second deionizing filter 31.

The heater 28 is arranged for heating the water from the water inlet 18. Hence, the heater 28 is arranged for heating the water before purification thereof. The heater 28 is, for example, arranged for heating the water to 20-30° C. or 25° C. The heater 28 is, for example, an immersion heater, such as a Backer 3000 W immersion heater. For example, the heater 28 is arranged between the water inlet 18 and the filter 25.

In the embodiment of FIG. 4, the filter 25 is a sediment filter for filtering off particles having a size of down to 5 microns. The carbon filter 29 is arranged for filtering off particles and for removing chlorine if necessary. For example, the carbon filter 29 is a carbon filter for filtering off particles of a size down to 10 microns. The softener filter 30 is, for example, a phosphate filter, for removing chemical particles from the water, such as chlorine. Alternatively, the softener filter 30 is another carbon filter or a combined carbon/softener filter for softening the water.

The water purification apparatus 19 according to FIG. 4 also comprises at least one booster pump 32, such as an Aquatec 8800, for pressurizing the reverse osmosis device 26 to a working pressure of, for example, 689 kPa (100 psi). For example, the booster pump 32 is arranged to provide a suitable working pressure of the reverse osmosis device 26. Alternatively, other types of pumps are used to provide suitable working pressure for the reverse osmosis device 26.

The reverse osmosis device 26 is arranged between the softener filter 30 and the first deionizing filter 27. The reverse osmosis device 26 is arranged for further removal of particles in the water. The reverse osmosis device 26 is, for example, arranged for removing bacteria, viruses and chemicals from the water. For example, the reverse osmosis device 26 is or includes an Axeon-HF4 Series Membrane Element, such as a HF4-4014 from Axeon Water Technologies. The size and number of reverse osmosis devices 26 and booster pumps 32 may vary depending on the amount of purified water to be produced. For example, the water purification apparatus 19 according to one embodiment produces about 1.100 litres per day, i.e. 0.79 l/min. For example, the water purification apparatus 19 is arranged for producing 0.2-5 l/min, 0.5-2 l/min or 0.5-1 l/min.

The first and second deionizing filters 27, 31 are arranged for deionizing and further purifying the water. According to the embodiment of FIG. 4 the deionizing filters 27, 31 are arranged between the reverse osmosis device 26 and the reservoir 20 for purified water, wherein water from the reverse osmosis device 26 is conducted to the deionizing filters 27, 31. The first and second deionizing filters 27, 31 are, for example, a double filter, such as US Water Aquapurion DI-66220 Dual 4.5"×20" Filtration System. The deionizing filters 27, 31 are, for example, arranged as interchangeable units. Alternatively, the deionizing filters 27, 31 comprise a tank with a deionizing material, wherein the deionizing material is replaceable.

The reservoir 20 is connected to the deionizing filters 27, 32, for receiving purified water therefrom. According to the illustrated embodiment a water purity meter 33, such as a TDS meter, is arranged for checking the purity of the water. For example, the water purity meter 33 is arranged between the deionizing filters 27, 32 and the reservoir 20 for checking the purity of the water before conducting the purified water to the reservoir 20. If the purified water contains contaminants, such as total dissolved solids, exceeding a predetermined threshold, it can be an indication that the deionizing filters 27, 32 and/or any of the sediment filter 25, the carbon filter 29 and the softener filter 30, needs to be changed. For example, the TDS meter is a HM Digital DM-1 Digital TDS Monitor. Alternatively, a conductivity meter is arranged between the deionizing filters 27, 31 and the reservoir 20 for purity control. The water is, for example, at a temperature of 25° C. during the measurement with the water purity meter 33.

The reservoir 20 is arranged for storing purified water. The reservoir 20 is, for example, a pressure tank. For example, the reservoir 20 is a pressure tank with a pressure of 34 to 48 kPa (5 to 7 psi) for obtaining a water pressure similar to that of the water supply network. For example, the reservoir 20 is arranged for providing a water pressure similar to the water pressure of the water entering the water purification apparatus 19. Alternatively, the reservoir 20 is another type of tank, such as an atmospheric tank. The reservoir 20 is dimensioned according to the application. For a system 10 in the form of a household appliance serving a single family the reservoir 20 is, for example, a 20-200 l tank. If the system 10 is for commercial use or serving a plurality of households the reservoir is, for example, a 100-1000 l tank. For example, the reservoir 20 is a 10-1000 l tank, a 20-500 l tank or a 50-100 l tank.

Figure 5:
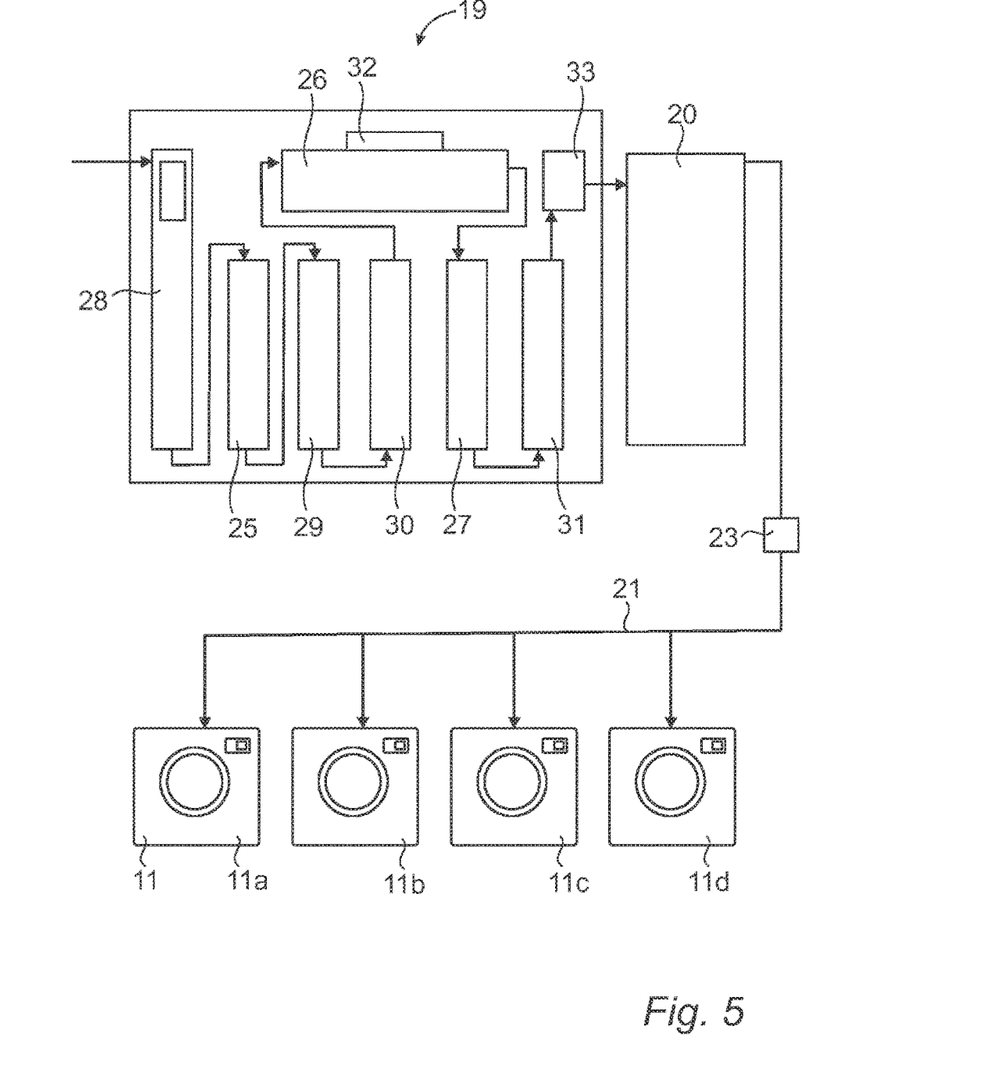
FIG. 5 is a schematic diagram showing a water purification apparatus according to FIG. 4 connected to a plurality of washing machines.

With reference to FIG. 5 the system 10 comprises a plurality of washing machines 11a-d, each having a container 13 for receiving items 12. According to FIG. 5 the system 10 comprises a single water purification apparatus 19, wherein the water purification apparatus 19 provides purified water to all washing machines 11a-d. In FIG. 5 the water purification apparatus 19 is connected to four washing machines 11a-d. Hence, the water purification apparatus 19 is connected to one or more washing machines 11, such as 1-10 washing machines 11. The water purification apparatus 19 is, for example, connected to one or more conventional washing machines 11a-d, wherein the system 10 comprises the one or more conventional washing machines 11a-d. In the illustrated embodiment, the water purification apparatus 19 is connected to the washing machines 11a-d by means of the tubing 21 and the pumping device 23 for conducting purified water to the washing machines 11a-d. The system 10 can be installed in present buildings as well as during construction of new buildings.

Figure 6:
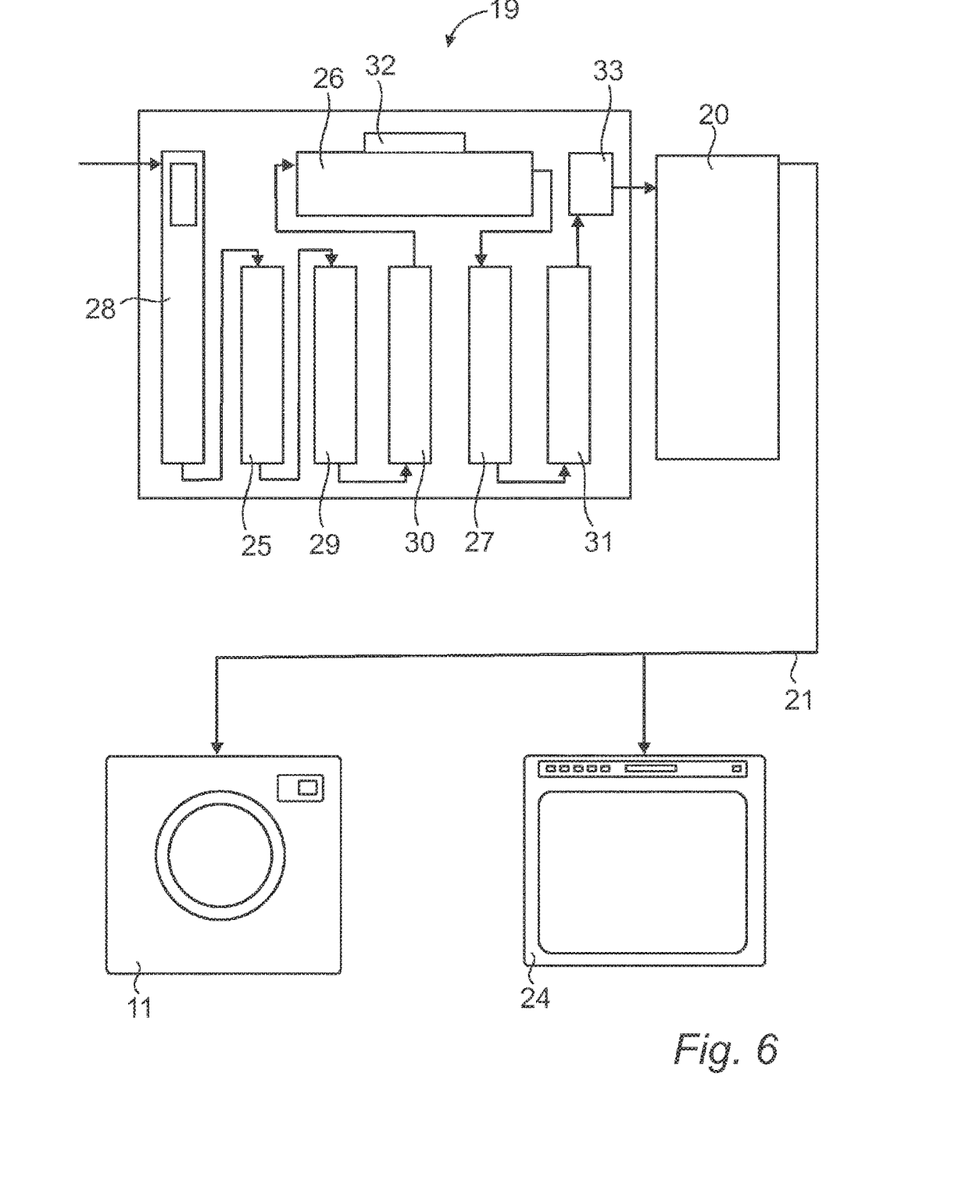
FIG. 6 is a schematic diagram showing a water purification apparatus according to FIG. 4 connected to a washing machine and a dishwasher.

With reference to FIG. 6 the system 10 comprises at least one washing machine 11 and at least one dishwasher 24, wherein the water purification apparatus 19 is connected to the at least one washing machine 11 and the at least one dishwasher 24 for providing purified water thereto for washing of items. The washing machine 11 and the dishwasher 24 are, for example, household appliances for domestic use, wherein items, such as laundry and dishes, can be cleaned without use of tensides or detergents. In the embodiment of FIG. 6 the washing machine 11 and the dishwasher 24 are connected to the reservoir 20 through the tubing 21, so that purified water from the water purification apparatus 19 can be conducted to the washing machine 11 and the dishwasher 24. It is understood that the system 10 can include a desired number of washing machines 11 and/or dishwashers 24 and/or other household appliances for washing items with water.

The invention claimed is:

1. A system for washing items with purified water, comprising a water inlet and a container for receiving the items to be washed, wherein the system comprises a water purification apparatus for purifying water introduced through said water inlet to produce purified water, the water purification apparatus comprising:
  at least one filter for filtering off particulate solids,
  a reverse osmosis device, and
  at least one deionizing filter comprising a tank with deionizing material, wherein the at least one deionizing filter is configured to be a mechanical filter, wherein the reverse osmosis device is arranged between the at least one filter for filtering off particulate solids and the tank with the deionizing material, and,
  wherein the system further comprises a reservoir for storing purified water produced by the water purification apparatus, said reservoir being connected to said water purification apparatus and said container, so that the items are washable inside the container with the purified water.

2. The system according to claim 1, wherein the water inlet is arranged for connection to a municipal water supply network.

3. The system according to claim 1, comprising a pump for obtaining a working pressure of the reverse osmosis device and the deionizing filter of 600-800 kPa.

4. The system according to claim 1, wherein the water purification apparatus comprises, arranged in consecutive order, a sediment filter, a carbon filter, a softener filter, the reverse osmosis device, a first deionizing filter and a second deionizing filter.

5. The system according to claim 1, comprising a heater arranged between the water inlet and the filter for heating the water to 20-30° C. or 25° C.

6. The system according to claim 1, wherein the water purification apparatus is arranged for providing purified water with 0-2 ppm total dissolved solids.

7. The system according to claim 1, wherein the system comprises a washing machine for washing laundry, or a dishwasher.

8. A method for washing items with purified water, comprising the steps of:
  a) conducting water from a water supply to a water inlet of a system for washing said items,
  b) conducting said water to a water purification apparatus for purifying said water,
  c) filtering off particulate solids from the water inside the water purification apparatus,
  d) purifying the water by means of reverse osmosis inside the water purification apparatus,
  e) after step d) filtering the water through at least one deionizing filter inside the water purification apparatus, the deionizing filter comprising a tank with a deionizing material, wherein the at least one deionizing filter is configured to be a mechanical filter,
  f) conducting the purified water to a reservoir for storing the purified water,
  g) conducting the purified water from the reservoir to a container with the items to be washed, and
  h) washing the items inside the container with the purified water.

9. The method according to claim 8, wherein in step a) the water is conducted from a municipal water supply network to the water inlet.

10. The method according to claim 8, wherein in step c) the water is conducted through a sediment filter, a carbon filter and a softener filter.

11. The method according to claim 8, wherein the water, after step e), is purified to 0-2 ppm total dissolved solids.

12. The method according to claim 8, wherein the water, after step d), is conducted through a first deionizing filter and a second deionizing filter.

13. The method according to claim 8, wherein the items are washed without tensides or detergents.

* * * * *